United States Patent [19]

English

[11] 3,993,906

[45] Nov. 23, 1976

[54] UNDERWATER RADIOGRAPHIC APPARATUS

[76] Inventor: Paul Nelson English, 2741 Iowa St., Baton Rouge, La. 70802

[22] Filed: June 25, 1975

[21] Appl. No.: 590,337

[52] U.S. Cl. .............................. 250/321; 250/323; 250/358 P
[51] Int. Cl.² .................. G03B 41/16; G01N 23/00
[58] Field of Search ................ 250/358 P, 321, 323

[56] References Cited
UNITED STATES PATENTS

| | | | |
|---|---|---|---|
| 2,412,174 | 12/1946 | Rhoades | 250/358 P |
| 2,747,100 | 5/1956 | Wyllie et al. | 250/358 P |
| 3,214,586 | 10/1965 | Graham | 250/321 |
| 3,673,407 | 6/1972 | Wiswell, Jr. | 250/321 |

Primary Examiner—Harold A. Dixon
Assistant Examiner—T. N. Grigsby
Attorney, Agent, or Firm—George F. Helfrich

[57] ABSTRACT

An inflatable bag is inserted through a small orifice in the side wall of a submerged, liquid-containing hollow member to be radiographed. The inflatable bag is directed to a chosen location within the hollow member, where it is inflated, displacing the liquid from the chosen location. A penetrating radiation source is securely positioned externally on the side wall of the hollow member so that penetrating radiation emanating from the source will traverse the chosen location within the hollow member. Imaging means is securely positioned externally on the side wall of the hollow member so that the chosen location within the hollow member is between the penetrating radiation source and the imaging means. After the radiograph has been made, the inflated bag is deflated and withdrawn from the orifice, following which the orifice is sealed, and the penetrating radiation source and imaging means are removed from the hollow member.

8 Claims, 13 Drawing Figures

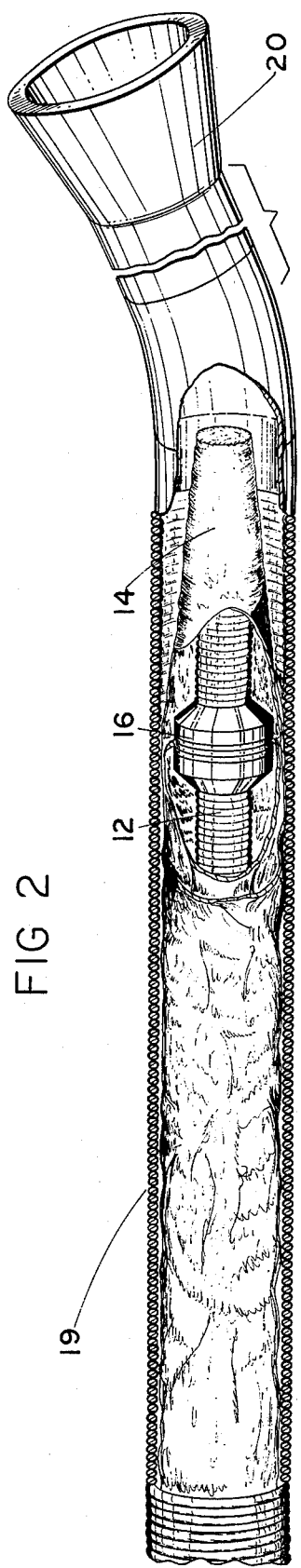
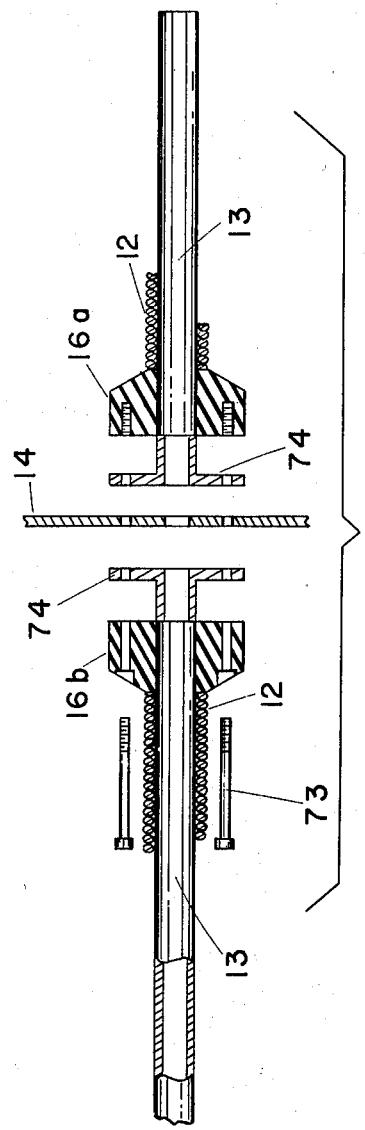
FIG 2
FIG 3

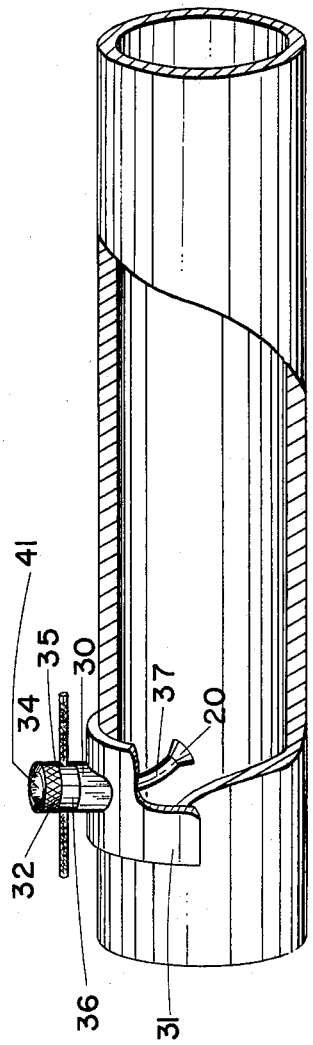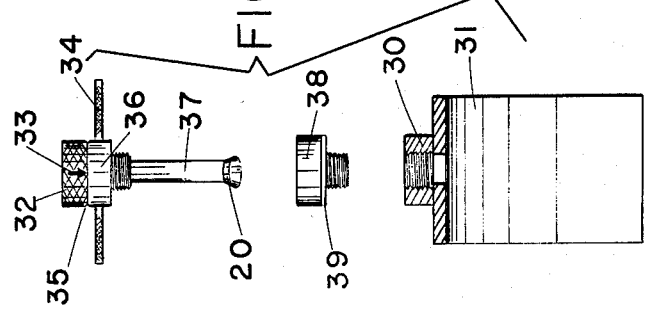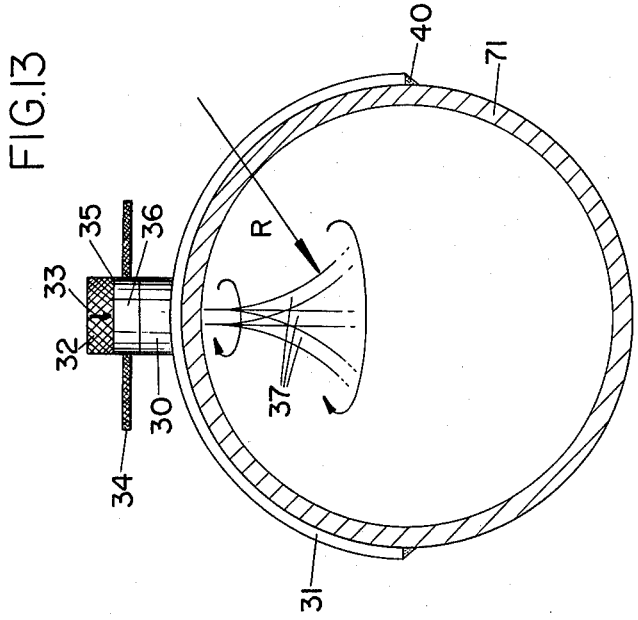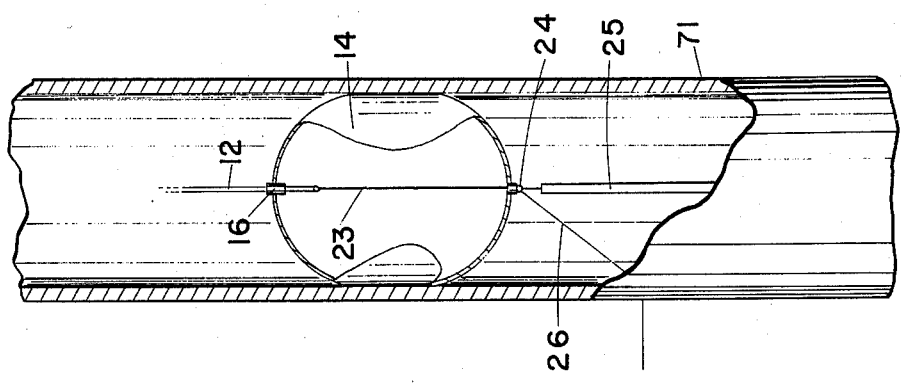

3,993,906

UNDERWATER RADIOGRAPHIC APPARATUS

BACKGROUND OF THE INVENTION

1. Field of the Invention

This invention relates generally to radiant energy. More particularly, it relates to the inspection of inanimate objects employing a source of high intensity radiation and a photographic detector.

2. Prior Art

During the past 30 years, radiant energy photography (viz, radiograpy) has become the primary quality control testing procedure for a large number of industrial purposes. In particular, radiography has been extensively employed in the examination of surface irregularities and defects, poor welding joints, etc., in steel and other metal plates, hollow bodies, girders, and other such objects.

Although the industrial uses of radiography are indeed numerous, present techniques for making radiographs in a wet environment have been found unsatisfactory in a number of instances.

For example, in the oil and gas industry, which has a multitude of offshore installations (i.e., platforms and pipelines) throughout the world, there has been a long-standing need for an efficacious, economical process and device for radiographing such installations quickly and in situ on the ocean floor. In particular, the prior art processes and devices, as exemplified by U.S. Pat. Nos. 3,214,586 and 3,673,407, have been found wanting, in that they do not provide the necessary combination of (1) effective removal of attenuating fluid media in the area being radiographed and (2) facile execution of the process by a diver in the underwater environment. This is especially true in respect of the radiographing of a pipeline containing a liquid hydrocarbon product or a small-diameter hollow support member filled with sea water.

As a consequence, the examination of the soundness of such pipelines and structures has been often resisted entirely or postponed for long periods of time, because of the attending expenses and inconvenience. Accordingly, in view of the age of some of these pipelines and structures, an actual danger does exist that the structures will fail or the hydrocarbon products within the pipelines will enter and pollute territorial waters, as well as sources and potential sources of water supply for cities and towns.

SUMMARY OF THE INVENTION

It is therefore the primary object of the present invention to provide a device for the effective, economical and facile production of radiographs of an underwater member containing a liquid, which device obviates the inadequacies of the prior art by providing both effective removable of attenuating fluid media and ease of execution by a diver in the under-water environment. A directly related object is to provide a device which would supply an impetus for the oil and gas industry to increase the frequency and quality of integrity examinations of their underwater structures, as a result of which our territorial waters, as well as our sources and potential sources of water supply, could be more effectively protected against intrusion by hydrocarbon products, which are capable of stifling the life-sustaining quality of these waters.

The device of the present invention comprises the combination of:

a. means for effecting a small orifice in the side wall of the hollow member;

b. means for inserting an inflatable bag through the orifice and directing the inflatable bag to a chosen location within the hollow member;

c. means for inflating the inflatable bag, thereby displacing the liquid from the chosen location within the hollow member;

d. penetrating radiation souce means securely positioned externally on the side wall of the hollow member so that penetrating radiation emanating from the source will traverse the chosen location within the hollow member; and e. imaging means securely positioned externally on the side wall of the hollow member so that the chosen location within the hollow member is between the penetrating radiation source means and the imaging means.

Moreover, it has been found of especial advantage if the device of the present invention additionally comprises means for deflating the inflatable bag after inflation thereof and withdrawing the deflated bag through the orifice.

In a preferred embodiment, the means for effecting the steps of inserting the inflatable bag through the orifice, directing the inflatable bag to the chosen location within the hollow member, inflating the inflatable bag, deflating the inflatable bag after inflation thereof, and withdrawing the deflated inflatable bag through the orifice comprises a hollow, flexible shaft having a flexible air-conveyance tube slidably secured axially therein, the mouth of the inflatable bag being hermetically secured to the flexible air-conveyance tube in proximity to the forward end thereof, the hollow, flexible shaft provided at the rear end thereof with torquing and forcing means for advancing the hollow, flexible shaft within the hollow member, and the flexible air-conveyance tube provided at the rear end thereof with valve means for effecting and controlling the inflation and deflation of the inflatable bag.

Furthermore, this device is especially advantageously employed in the radiographing of submerged horizontal members if it comprises in addition a flexible conveyance sheath terminating at its forward end in a flared nozzle and at its rear end in torquing and forcing means, the hollow, flexible shaft being slidably secured axially within the flexible conveyance sheath. Particularly useful in conjunction with the flexible conveyance sheath is a rounded, removable cap for covering the flared nozzle of the flexible conveyance sheath and facilitating the insertion thereof through the orifice and the subsequent movement thereof through the hollow member.

In the radiographing of submerged vertical members, it is most desirable if, instead of the conveyance sheath, the device comprises in addition a cable attached to the flexible air-conveyance tube at a point within the inflatable bag, the cable extending axially through the interior of the inflatable bag and passing through a hermetic seal in the forward wall of the inflatable bag, the cable terminating in a ring having a buoyancy-compensating weight attached thereto. An alternative embodiment for the radiographing of submerged vertical members comprehends said cable terminating in a ring having a buoyancy-compensating restraining wire attached thereto.

Finally, it has been found of great advantage in the radiographing of both horizontal and vertical members if the basic device additionally comprises a receiving section having a passageway therethrough communicating with the orifice in the side wall of the hollow member, the receiving section having a saddle attached thereto for hermetically securing the receiving section to the side wall of the hollow member, the receiving section being adapted for alternatively a. receiving a plug for hermetically sealing the hollow member from the surrounding medium, and
b. admitting and securely positioning substantially axially within the hollow member in the direction of the chosen location thereof, a rigid, curved guide tube having a flared nozzle at its forward end, the guide tube being adapted to receive and transmit the hollow, flexible shaft enclosing the flexible air-conveyance tube having the inflatable bag hermetically secured thereto in proximity to the forward end thereof.

BRIEF DESCRIPTION OF THE DRAWING

For a more complete understanding of the present invention, including its objects and benefits, reference should be made to the description of the preferred embodiments, which is set forth in detail below. This description should be read together with the accompanying drawing, wherein:

FIG. 2 in cutaway perspective supplies further detail with respect to certain elements of the embodiment depicted in FIG. 1;

FIG. 3 is a partial sectional view picturing a means for the attachment of inflatable bag(14) of FIG. 2;

FIG. 10 in cutaway perspective pictures additional embodiments of the present invention which are advantageously utilized in the underwater radiographing of vertical hollow members;

FIG. 11 is a cutway perspective detailing yet another embodiment of the present invention which is especially useful in the radiographing of horizontal hollow members;

FIG. 12 is a perspective view supplying further detail with respect to the construction of the embodiment of FIG. 11; and FIG. 13 is a partial sectional view supplying detail concerning the utilization of the embodiment of FIG. 11.

DESCRIPTION OF THE PREFERRED EMBODIMENTS

Although the device of the present invention may be effectively used in the radiographing of a wide variety of liquid-containing, submerged hollow members, it is particularly suitable in the radiographing of objects such as pipelines and hollow structural members, which ordinarily contain either hydrocarbon products or water. When the device according to the present invention is employed, it is not necessary to dismantle or sever or tear open the hollow member. On the contrary, a small (e.g. 2 inches in diameter) orifice is formed in the wall of the hollow member (e.g., by cutting, stamping, or drilling) in proximity to the section thereof to be radiographed. The orifice—which is just large enough to allow the passage therethrough of an inflatable bag and means communicating with the inflatable bag for directing the bag to a chosen location within the hollow member and inflating the inflatable bag—is relatively small with respect to the surface area of the hollow member, thereby ensuring no substantial damage to the structural integrity of the hollow member, and further ensuring that loss of any valuable liquid from the interior of the hollow member, as well as any diffusion into the hollow member, are minimized.

Figure 1:
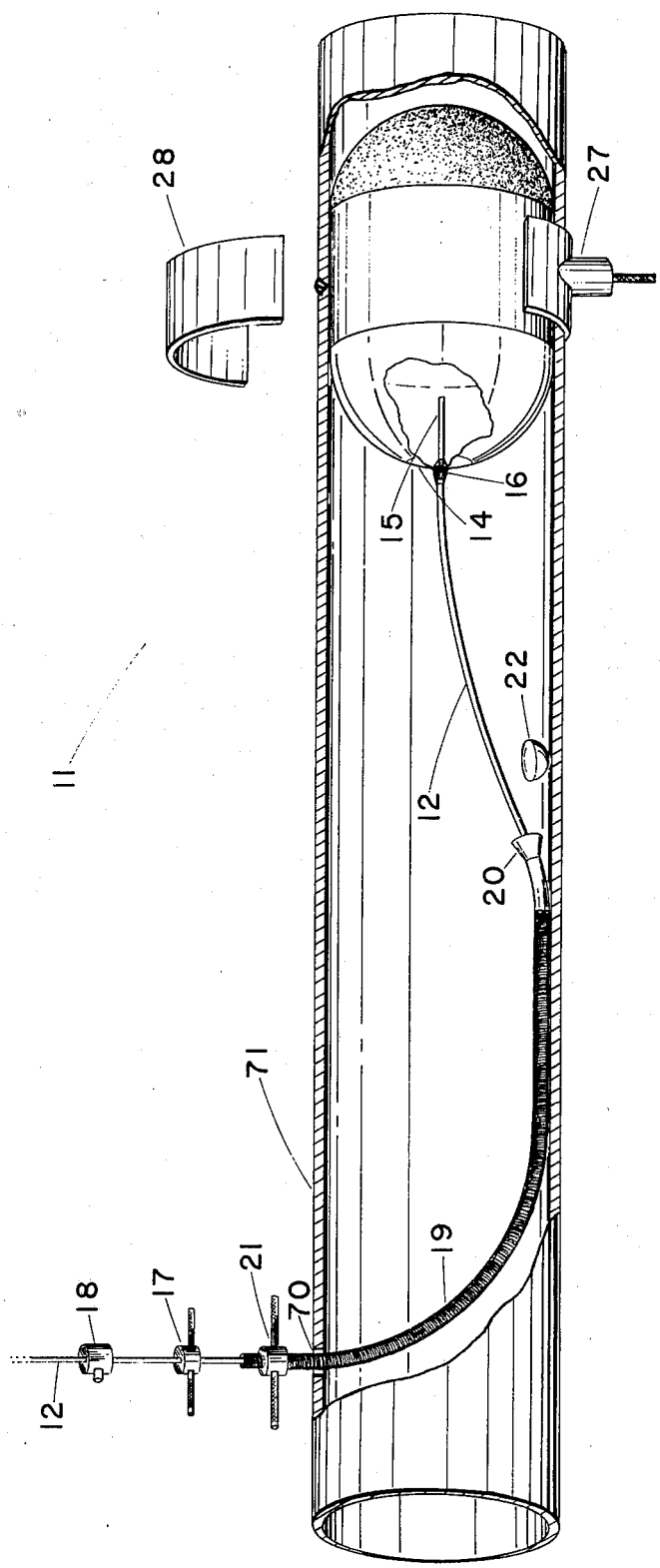
FIG. 1 is a cutaway perspective illustrating the particulars of the construction of a preferred embodiment according to the present invention.

In FIG. 1, which details a preferred embodiment 11 according to the present invention, orifice 70 is drilled in the side wall of horizontal pipeline 71 in proximity to the section thereof to be radiographed. Thereupon an inflatable bag is inserted by suitable means through orifice 70 and directed by appropriate means to a chosen location within pipeline 71 which is encompassed by the section thereof to be radiographed. The inflatable bag is then inflated by suitable means with air or another fluid having low scatter and absorption characteristics, thereby displacing the liquid from the chosen location within pipeline 71. (In FIG. 1, inflatable bag 14 is shown in its inflated configuration within the chosen location.) Thereupon penetrating radiation source means 27 is securely positioned externally on the side wall of pipeline 71 so that penetrating radiation emanating from source means 27 will traverse the area to be radiographed, which includes the chosen location within pipeline 71 (from which liquid has been displaced by inflatable bag 14 containing the fluid of low scatter and absorption coefficients for the penetrating radiation employed.) Thereby attenuation of the radiation is significantly reduced, which will afford the production of radiographs of high resolution. While almost any penetrating radiation source may be utilized, preferred sources include neutrons and gamma rays, with the latter being especially preferred because of ready availability in the form of certain isotopes. Examples of suitable gamma ray isotope sources include cobalt 60 and iridium 192. Simultaneously with the placement of source means 27, or preferably prior thereto, imaging means 28 is securely positioned externally on the side wall of pipeline 71 so that the chosen location encompassing inflated inflatable bag 14 is between penetrating radiation source means 27 and imaging means 28. Imaging means 28 is advantageously standard radiographic or X-ray film well known in the art. In positioning imaging means 28 it is important that there be a minimum separation between the film and pipeline 71, in order to avoid distortions of the images produced. Imaging means 28 and source means 27 are kept in position for a given exposure time, which is determined by standard methods well known in the art, being based upon the type of film employed and the nature and intensity of the radiation utilized. After the proper exposure, source means 27 and imaging means 28 are removed from the pipeline 71 and the film is developed by standard means well known in the art, resulting in a radiograph of high quality.

In the embodiment pictured in FIG. 1, the means for inserting the inflatable bag through the orifice, directing the inflatable bag to the chosen location within the pipeline, and inflating the inflatable bag also provides for deflating the inflated inflatable bag after inflation thereof and withdrawing the deflated inflatable bag through the orifice. Although these provisions are not essential, they are highly advantageous in the employment of a device according to the present invention. Were such provisions not made, the inflatable bag — after being torn from the means for introducing, directing, and inflating it — would be left inside the pipeline after completion of the radiographing, and a plug or the like would be inserted into the orifice.

In the embodiment pictured in FIG. 1, appropriate means for effecting the steps of inserting inflatable bag 14 through orifice 70, directing inflatable bag 14 to the chosen location within pipeline 71, inflating inflatable bag 14, deflating the inflated inflatable bag 14, and withdrawing the deflated inflatable bag 14 through orifice 70 comprises hollow, flexible shaft 12 (e.g., a tubular configuration of spiral-wound steel), having a flexible air conveyance tube (not shown in this figure) slidably secured axially therein. The air conveyance tube, which is advantageously constructed from a polymeric material such as polyethylene or polypropylene, is shown in FIG. 3 as 13. The mouth 15 of inflatable bag 14, which is constructed from any standard flexible, film-forming polymeric material such as puncture-resistant rubber, is hermetically secured to the flexible, air-conveyance tube by means of collar 16 in proximity to the forward ends of hollow shaft 12 and the flexible, air conveyance tube, as shown in detail in FIG. 3. Hollow, flexible shaft 12 is provided at the rear end thereof with torquing and forcing means such as handle 17, which is slidably and releasably secured to shaft 12 by means of locking screws or the like. Handle 17 provides for advancement of shaft 12 within pipeline 71, and as shown in FIG. 1, within conveyance sheath 19, when such is employed. Conveyance sheath 19, which is in advantageously a spiral-wound steel configuration, is, although not absolutely essential to the successful operation of device 11, highly desirable for facilitating the removal of inflatable bag 14 after deflation thereof, as hereinafter explicated in detail with reference to FIGS. 4–9. The flexible, air-conveyance tube is provided at or in proximity to the rear end thereof with valve means 18 for effecting and controlling the inflation and deflation of inflatable bag 14. Conveyance sheath 19 terminates at its forward end in flared nozzle 20 — also advantageously constructed of steel — and at its rear end in torquing and forcing means such as handle 21, which is slidably attached to conveyance sheath 19 by means of locking screws or the like. Hollow, flexible shaft 12 is slidably secured axially within flexible conveyance sheath 19. Flared nozzle 20 is employed to greatly facilitate the entry of the deflated inflatable bag 14 into conveyance sheath 19 for removal thereof through orifice 70, as hereinafter more clearly understood, with particular reference to FIGS. 4–9. When conveyance sheath 19 is employed, it is highly advantageous — although not absolutely essential to the operation of the present invention — to employ in addition cap 22, which is releasably secured to nozzle 20 for facilitation of the insertion and movement of sheath 19 through pipeline 71. Upon the emergence of shaft 12 and inflatable bag 14 from the forward end of sheath 19 (see discussion infra re FIGS. 4–9) cap 22 is released from the end of nozzle 20 and falls to the bottom wall of pipeline 71 as is shown in FIG. 1. Referring now to FIG. 2, there is shown a segment of the embodiment pictured in FIG. 1. In FIG. 2 inflatable bag 14 is shown in its non-inflated configuration, positioned inside conveyance sheath 189. In this configuration inflatable bag 14 is transported by conveyance sheath 19 within the pipeline to and from the chosen location therein. Inflatable bag 14 is attached hermetically at its mouth to flexible air conveyance tube 13 (not shown in this figure) by means of collar 16, which is mounted between the two segments of flexible shaft 12. Further detail with respect to the attachment of inflatable bag 14 to air conveyance tube 13 is given in FIG. 3. As in shown in this figure, air conveyance tube 13 is divided into 2 segments, each terminating in a rubber flange 74. Hollow, flexible shaft 12, which encompasses air conveyance tube 13 slidably secured therein, is also divided into 2 segments, which terminate in halves 16a and 16b of collar 16. The mouth of inflatable bag 14 is positioned between flanges 74, and the segments of flexible shaft 12 are then pressed together. Screws 73 serve to hermetically secure the mouth of inflatable bag 14 within flanges 74 and the halves 16a and 16b of collar 16.

Figure 4:
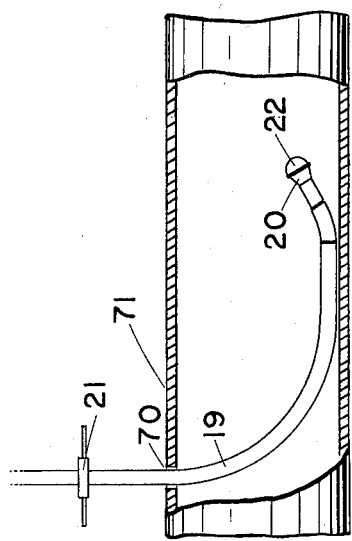
FIGS. 4-9 comprise a sequence of cutaway persective views which illustrate in step-wise fashion exactly how the embodiment of FIG. 1 is employed.
Figure 5:
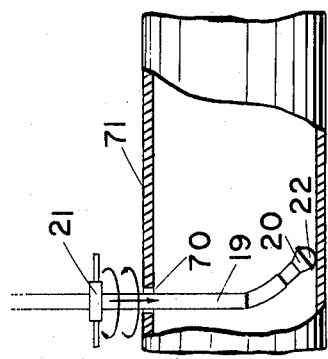
Figure 6:
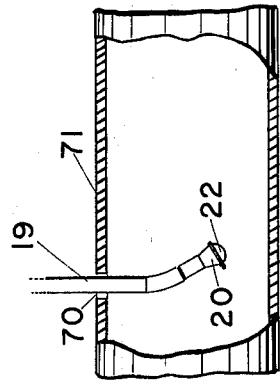
Figure 7:
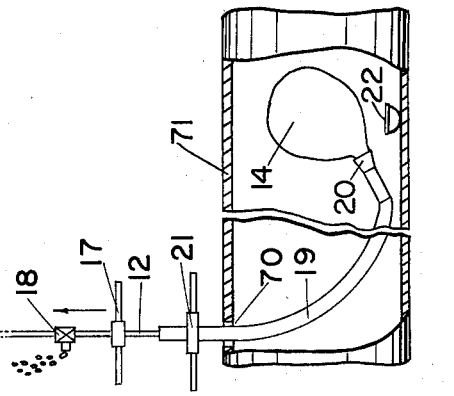
Figure 8:
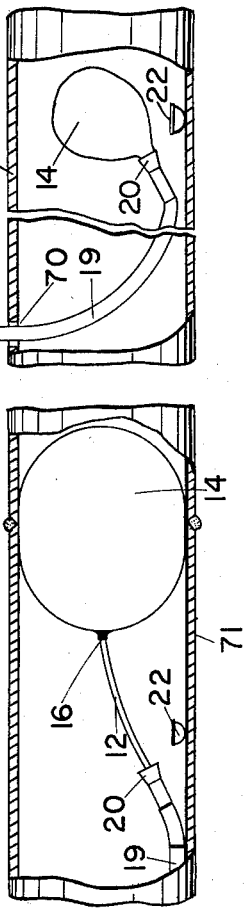
Figure 9:
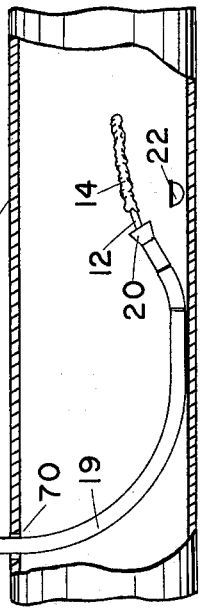

Referring now to FIGS. 4–9, the utilization of a preferred embodiment of the present invention is schematically clarified. After the effecting of a small orifice 70 is underwater pipeline 71, conveyance sheath 19 is inserted through orifice 70 into the interior of the pipeline, as is shown in FIG. 4. Cap 22, which is removably secured to flared nozzle 20, facilitates this insertion. The insertion of sheath 19 continues until, as shown in FIG. 5, cap 22 comes to rest on the bottom of the interior wall of pipeline 71. Thereupon torquing and forcing means (e.g., handle 21) is utilized to advance the forward end of sheath 19 to a chosen location within pipeline 71, as shown in FIG. 6. Handle 21, which is slidably and releasably secured to sheath 19, is moved in the direction of the arrows given in FIG. 5, thereby causing sheath 19 to advance. Cap 22 facilitates the advancement of sheath 19 through pipeline 71. That the forward end of sheath 19 has substantially reached the chosen location within pipeline 71 is determined by considering the distance of the chosen location from orifice 70 and the length of sheath 19 which has passed through orifice 70. When the chosen location has been substantially reached, torquing and forcing means (e.g., handle 17 ) is utilized to cause shaft 12 to advance within sheath 19 and to exit therefrom, as shown in FIG. 7, thereby causing cap 22 to be released from nozzle 20 and exposing inflatable bag 14, the attachment of which has been previously detailed. Handle 17, which is slidably and releasably secured to shaft 12, is moved in the direction of the arrows given in FIG. 7. The advancement of shaft 12 is allowed to continue until an appropriate length of the shaft is exposed, i.e., until inflatable bag 14 is approximately centered within the chosen location. Thereupon inflatable bag (14) is inflated by valve means now shown in FIG. 8. After the source and imaging means (not shown in FIGS. 4–9) have been positioned and the proper exposure has been made, the source and imaging means are removed, and the inflated inflatable bag 14 is deflated as shown in FIG. 9 by valve means 18. Thereupon bag 14 is drawn into sheath 19 by means of handle 17, which is moved in the direction shown in FIG. 9. Following this, sheath 19 is withdrawn through orifice 70 by means of handle 21, and a plug is placed in orifice 70 to seal pipeline 71 from the medium surrounding it.

Conveyance sheath 19, which is most advantageously employed, is not essential, however, as shaft 12 with the attached inflatable bag may be inserted, advanced, and withdrawn without sheath 19, as is clear to those of skill in the art. However, the insertion, advancement, and withdrawal of shaft 12 are greatly facilitated by the presence of sheath 19.

Referring now to FIG. 10, ther is shown an embodiment of the present invention especially suitable in the radiographing of vertical hollow members. The conveyance sheath 19 and attending appurtenances are not employed. Instead thereof, the embodiment comprises a thin cable 23 (e.g., of steel) attached to the flexible air conveyance tube 13 or shaft 12 at a point inside the inflatable bag and extending axially through the interior of the inflatable bag and passing through a hermetic seal in the forward wall of the inflatable bag. Cable 23 terminates in attaching ring 24 (e.g., of steel), which has the buoyancy — compensating weight 25 (e.g., of lead) attached thereto, or alternatively, buoyancy - compensating restraining wire 26 (e.g., of steel). In either case, the buoyant force exerted on inflated inflatable bag 14 by the liquid contained in pipeline 71 is overcome, and bag 14 is caused to maintain its position within the chosen location in vertical pipeline 71. If the buoyancy - compensating wire 26 is employed, another orifice must be effected within the wall of pipeline 71 at a point below the chosen location for bag 14, and suitable means (e.g., magnetic means) are advantageously employed to cause the passage of wire 26 through such orifice for subsequent attachment.

Referring now to FIGS. 11 – 13, there is shown yet another embodiment of the present invention, which is an alternative to the previously described employment of flexible insertion and guide means for horizontal members. The device, which comprises means for effecting a small orifice, a flexible shaft having a flexible air conveyance tube slidably secured axially therein, an inflatable bag hermetically secured to the air conveyance tube in proximity to the forward end thereof, and valve and torquing and forcing means as described hereinabove, comprises in addition a threaded receiving section 30 having a saddle 31 attached thereto, which is placed as a unit over the orifice in the hollow member, so that the passageway in receiving section 30 communicates with the orifice in the hollow member. Saddle 31 hermetically secures receiving section 30 to the hollow member by temporary clamping, or welding as at 40 in FIG. 13. In the latter case saddle 31 acts as a permanent structural reinforcement for the hollow member. Receiving section 30 is adapted for alternatively: (a) receiving plug 38 which, with gasket 39, will seal the hollow member from the surrounding medium; and (b) admitting and securely positioning substantially axially within the hollow member in the direction of the chosen location thereof, a rigid, curved guide tube 37 having flared nozzle 20 at its forward end. Guide tube 37 is designed to receive and transmit the hollow, flexible shaft enclosing the flexible air conveyance tube having the inflatable bag hermetically secured thereto, and to facilitate the withdrawal of the same after deflation of the inflatable bag at the conclusion of the radiographing. For this purpose, curved guide tube 37 communicates with threaded section 36 for the securing of guide tube 37 within section 30. Torquing handles 34 facilitate the insertion and screwing of guide tube 37 into section 30. Knurled section 32 is rigidly attached to guide tube 37, both of which swivel as a unit within threaded section 36, forming swivel joint 35. Arrow 33 indicates the direction in which guide tube 37 is pointing. As is schematically represented in FIG. 13, radius R of guide tube 37 is chosen so that guide tube 37 may swivel freely within pipeline 71.

Radiographs of excellent quality are afforded by the utilization of each of the preferred embodiments described hereinabove.

Although the present invention has been described in detail with respect to certain preferred embodiments thereof, it is apparent to those of skill in this art that variations and modifications in this detail may be accomplished without any departure from the spirit and scope of the invention, as defined in the hereto-appended claims.

What is claimed is:

1. In a device for the underwater radiography of a hollow member containing a liquid and having a small orifice in the sidewall thereof, the improvement therein which comprises the combination of:
   a. means of inserting an inflatable bag through the orifice and directing the inflatable bag to a chosen location within the hollow member;
   b. means for inflating the inflatable bag, thereby displacing the liquid from the chosen location within the hollow member;
   c. penetrating radiation source means securely positioned externally on the side wall of the hollow member so that penetrating radiation emanating from the source will traverse the chosen location within the hollow member; and
   d. imaging means securely positioned externally on the side wall of the hollow member so that the chosen location within the hollow member is between the penetrating radiation source means and the imaging means.

2. The device of claim 1, which additionally comprises means for deflating the inflatable bag after inflation thereof and withdrawing the deflated inflatable bag through the orifice.

3. The device of claim 2, wherein the means for effecting the steps of inserting the inflatable bag through the orifice, directing the inflatable bag to the chosen location within the hollow member, inflating the inflatable bag, deflating the inflatable bag after inflation thereof, and withdrawing the deflated inflatable bag through the orifice comprises a hollow, flexible shaft having a flexible air-conveyance tube slidably secured axially therein, the mouth of the inflatable bag being hermetically secured to the flexible air-conveyance tube in proximity to the forward end thereof, the hollow, flexible shaft provided at the rear end thereof with torquing and forcing means for advancing the hollow, flexible shaft within the hollow member, the flexible air-conveyance tube provided at the rear end thereof with valve means for effecting and controlling the inflation and deflation of the inflatable bag.

4. The device of claim 3, which comprises in addition a flexible conveyance sheath terminating at its forward end in a flared nozzle and at its rear end in torquing and forcing means, the hollow, flexible shaft being slidably secured axially within the flexible conveyance sheath.

5. The device of claim 4, which comprises in addition a rounded, removable cap for covering the flared nozzle of the flexible conveyance sheath and facilitating the insertion thereof through the orifice and the subsequent movement thereof through the hollow member.

6. The device of claim 3, which comprises in addition a cable attached to the flexible air-conveyance tube at a point within the inflatable bag, the cable extending axially through the interior of the inflatable bag and passing through a hermetic seal in the forward wall of the inflatable bag, the cable terminating in a ring having a buoyancy-compensating weight attached thereto.

7. The device of claim 3, which comprises in addition a cable attached to the flexible air-conveyance tube at a point within the inflatable bag, the cable extending axially through the interior of the inflatable bag and passing through a hermetic seal in the forward end of the inflatable bag, the cable terminating in a ring having a buoyancy-compensating restraining wire attached thereto.

8. The device of claim 3, which additionally comprises a receiving section having a passageway therethrough communicating with the orifice in the side wall of the hollow member, the receiving section having a saddle attached thereto for hermetically securing the receiving section to the side wall of the hollow member, the receiving section being adapted for alternatively
   a. receiving a plug for hermetically sealing the hollow member from the surrounding medium, and
   (b). admitting and securely positioning substantially axially within the hollow member in the direction of the chosen location thereof, a rigid, curved guide tube having a flared nozzle at its forward end, the guide tube being adapted to receive and transmit the hollow, flexible shaft enclosing the flexible air-conveyance tube having the inflatable bag hermetically secured thereto in proximity to the forward end thereof.

* * * * *